E. R. KLEMM.
ANTISKID CHAIN.
APPLICATION FILED MAY 10, 1919.
1,338,087.
Patented Apr. 27, 1920.
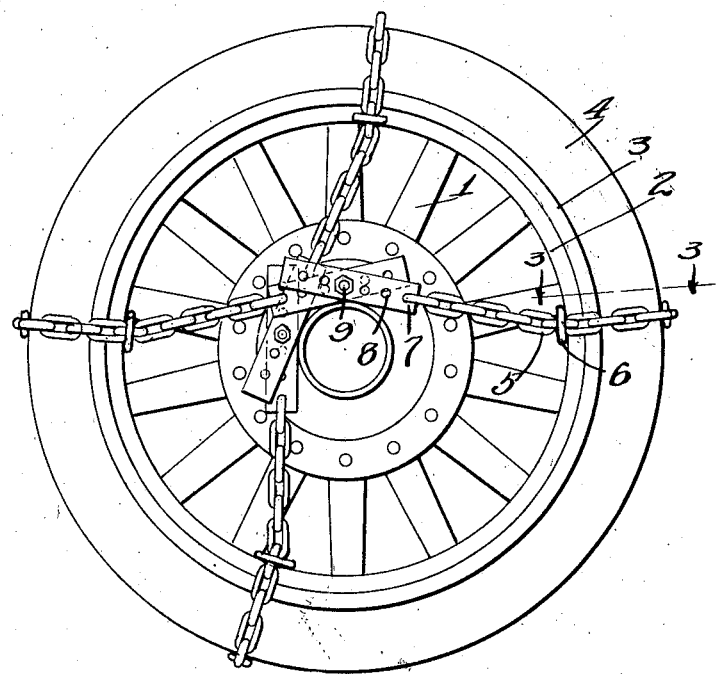
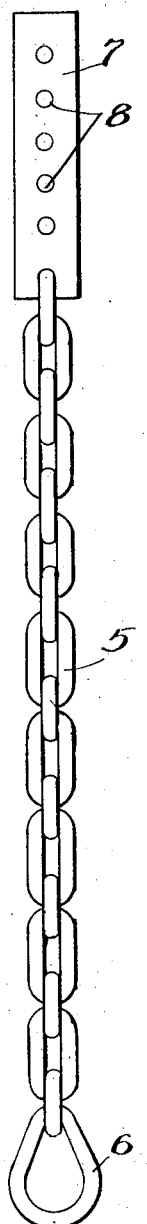
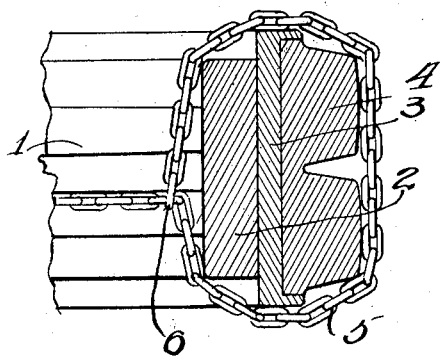
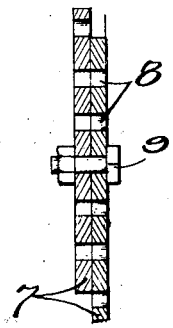

UNITED STATES PATENT OFFICE.

EMIL R. KLEMM, OF CHICAGO, ILLINOIS.

ANTISKID-CHAIN.

1,338,087.  Specification of Letters Patent.  Patented Apr. 27, 1920.

Application filed May 10, 1919. Serial No. 296,080.

*To all whom it may concern:*

Be it known that I, EMIL R. KLEMM, a citizen of the United States, and a resident of the city of Chicago, in the county of Cook and State of Illinois, have invented certain new and useful Improvements in Antiskid-Chains; and I do hereby declare that the following is a full, clear, and exact description of the same, reference being had to the accompanying drawings, and to the numerals of reference marked thereon, which form a part of this specification.

This invention relates to an improved type of an anti-skid chain adapted to be used in pairs on a vehicle wheel with the looped outer ends of the chains engaged around the wheel tire and rim while apertured plates on the inner ends of the chains are removably bolted together.

It is an object of this invention to provide an anti-skid chain adapted to be quickly engaged in position upon a vehicle wheel to obviate skidding.

Another object of the invention is the construction of a non-skid chain wherein one end is adapted to be looped around the tire of a wheel while the other end extends toward the hub of the wheel and is connected to a similar chain on the opposite side of the wheel.

A further object of the invention is the construction of an anti-skid chain having a ring on one end and an apertured plate on the other end for the purpose of securing the chain in position on a vehicle wheel to prevent skidding.

It is an important object of this invention to provide a tire chain of simple and effective construction adapted to be engaged on a vehicle wheel and secured to a similar chain to facilitate the extrication of automobile trucks when the wheels thereof are caught in ruts or holes.

Other and further important objects of this invention will be seen from the disclosures in the specification and drawings.

The invention (in a preferred form) is illustrated in the drawings and hereinafter more fully described.

On the drawings:

Figure 1 is an elevational view of an antiskid chain embodying the principles of this invention.

Fig. 2 is a side elevation of a vehicle wheel equipped with a plurality of pairs of the anti-skid chains.

Fig. 3 is an enlarged fragmentary section taken on line 3—3 of Fig. 2, showing parts in elevation.

Fig. 4 is a longitudinal detail section taken through two connected chain plates.

As shown on the drawings:

The reference numeral 1, indicates a vehicle wheel embracing a felly 2, a rim 3, and a tire 4. The wheel is shown equipped with a plurality of pairs of anti-skid devices, each comprising a link chain 5, having a ring 6, attached at one end, and a plate 7, at the other end. The plate 7, is provided with a plurality of longitudinally alined openings or apertures 8 adapted to permit locking bolts 9, to be engaged therethrough for the purpose of releasably locking two plates together as shown in Fig. 4.

The operation is as follows:

The anti-skid devices are used in pairs and are adapted to be very conveniently and rapidly engaged on a vehicle wheel in position for use by simply looping the ring end of a chain 5, around the tire, rim and felly of the wheel, as shown in Fig. 3, and passing the plate and chain through the ring 6, to permit the looped end of the device to be engaged in place. A second device is similarly engaged on the opposite side of the wheel, and the two plates 7, are removably secured together by a locking bolt 9, as shown in Fig. 2. The bolt 9, is projected through two of the registering openings 8, of the co-acting plates 7. The plurality of openings 8, in each of the plates 7, permits a pair of the anti-skid devices to be adjustably connected across a vehicle wheel.

Any desired number of pairs of anti-skid chains may be removably engaged on a vehicle wheel as disclosed in Fig. 1, to prevent skidding of a vehicle.

Trucks carrying heavy loads or passenger automobiles very often get stuck in the ruts and holes of bad roads, and are very difficult to free, without additional help and equipment. If a truck not equipped with anti-skid chains of the ordinary type, is stuck, it is often quite impossible to put on the chains peripherally around the wheels, especially on those wheels which are stuck in ruts or holes.

The improved type of anti-skid device of this invention may be readily engaged in position in an exceedingly short time. If the rear wheels of a truck are stuck in a hole so that the truck cannot be moved one chain 5, is looped around the tire at or near the point where the wheel is caught, and a second chain is engaged on the opposite side of the wheel. The two plates 7, are then secured together by a bolt 9. When necessary two or more pairs of the chains may be secured in place and the vehicle can then be started and easily moved out of the rut or hole in which it was stuck.

I am aware that various details of construction may be varied through a wide range without departing from the principles of this invention and I therefore do not purpose limiting the patent granted otherwise than necessitated by the scope of the appended claims.

I claim as my invention:

1. In an anti-skid device the combination with a wheel of a plurality of oppositely positioned chains removably looped around the tire thereof, a plate on the inner end of each chain, and means for removably securing the plates of oppositely positioned chains together.

2. An anti-skid device comprising flexible means, an apertured plate engaged on one end thereof, a ring on the other end of the flexible means, and means engaged through the apertured plate for locking said plate to a similar plate of a second anti-skid device.

3. An anti-skid device embracing a chain, a plate engaged on one end thereof and having apertures therein, a ring on the other end of the chain, and a bolt adapted to engage through one of said apertures for locking said plate to a similar plate of a second anti-skid device.

4. The combination with a vehicle wheel of a plurality of chains extending diametrically across said wheel and looped around the tire thereof, and apertured plates for connecting said chains and varying the effective lengths thereof.

5. The combination with a pair of chains, of a ring on each of said chains to permit the chains to be engaged around the tire of a vehicle, apertured plates on said chains, and means for removably securing the plates together.

In testimony whereof I have hereunto subscribed my name in the presence of two subscribing witnesses.

EMIL R. KLEMM.

Witnesses:
FRED E. CAESLER,
CHARLES W. HILLS, JR.